United States Patent [19]

Waddell

[11] 3,967,695
[45] July 6, 1976

[54] YIELDABLE VEHICLE STEP
[75] Inventor: Bennett N. Waddell, Joliet, Ill.
[73] Assignee: Caterpillar Tractor Co., Peoria, Ill.
[22] Filed: Sept. 17, 1975
[21] Appl. No.: 614,054

[52] U.S. Cl. .................................. 182/86; 182/90; 280/166
[51] Int. Cl.² ........................................ B60R 3/00
[58] Field of Search ................ 182/90, 91, 89, 196, 182/197, 198; 280/166

[56] References Cited
UNITED STATES PATENTS

| | | | |
|---|---|---|---|
| 2,397,953 | 4/1946 | Ellis | 182/196 |
| 3,083,785 | 4/1963 | Hyman | 182/89 |

Primary Examiner—Reinaldo P. Machado
Attorney, Agent, or Firm—Oscar G. Pence

[57] ABSTRACT

A yieldable vehicle step is provided having a rigid foot support member pendantly supported from the side of a vehicle frame by a pair of relatively strong, but deflectable legs. Each leg is constructed from a chain and an outer deformable stiffener member circumposed about such chain. The outer member affords sufficient lateral rigidity or stiffness to the legs so as to minimize undue swinging movement of the step when in use, but which automatically returns to its suspended position whenever deflected by contact with an obstruction during movement of the vehicle.

10 Claims, 3 Drawing Figures

U.S. Patent  July 6, 1976  3,967,695
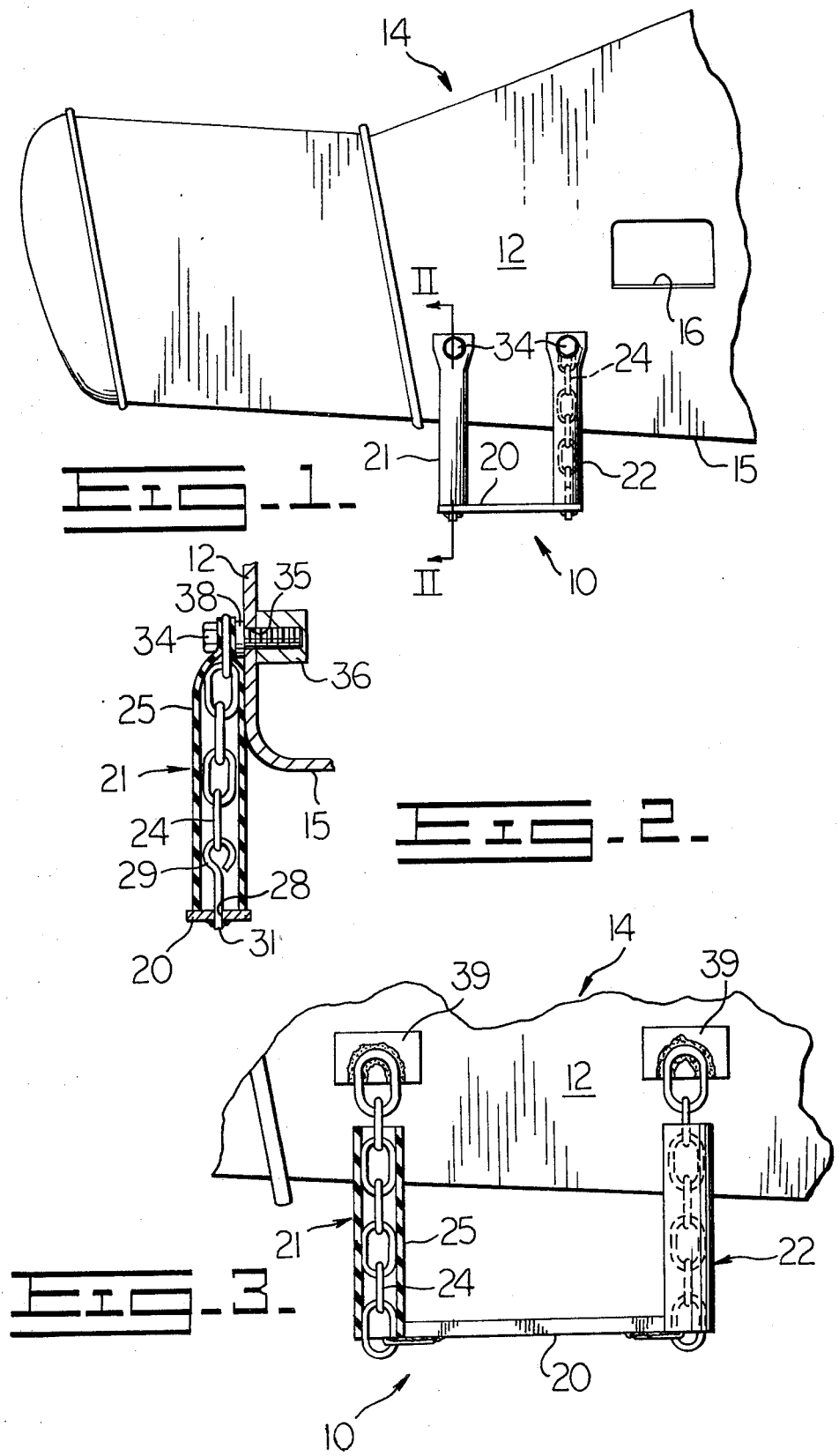

YIELDABLE VEHICLE STEP

BACKGROUND OF THE INVENTION

This invention relates to a vehicle step for use in mounting a high ground clearance vehicle, and more particularly to a step which will not be damaged upon being struck by an obstruction during the operation of such vehicle.

In vehicles of the large earthmoving type, it will be understood that the normal ground clearance thereof may be sufficiently high that a step is needed to gain access to various portions thereof, including the operator station and numerous service areas. The step, which by necessity must be within easy reach of the ground, usually necessitates that at least the bottom portion thereof be placed below the normal ground clearance of the vehicle. Therefore, the step is in a location where it is highly susceptible to damage by being struck by obstructions and the like as the vehicle is moved from place to place. This is especially true for earthmoving vehicles, such as tractor-scraper vehicles, which are driven over rough terrain littered with obstacles such as bolders, mounds of dirt and the like.

Thus, the use of a permanently fixed step of rigid construction has not been satisfactory due to the likelihood of the step being damaged and/or rendered unserviceable after a short period of service. Attempts to solve this problem by providing a felxible or swinging step have had limited success primarily due to the fact that they lack sufficient strength to withstand the abuse to which they are subjected and, thus, have a limited life expectancy or they lack sufficient lateral rigidity to keep the step in its proper position when being used to mount or dismount from the vehicle so as to prevent possible injury to the operator, such as banging his shins against the frame or the like.

SUMMARY AND OBJECTS OF THE INVENTION

Accordingly, an object of this invention is to provide a yieldable vehicle step which is capable of deflecting in substantially any direction when struck by an obstacle during movement of the vehicle, while exhibiting sufficient rigidity so as to prevent undue swinging movement of the step when stepped upon for mounting or dismounting from the vehicle.

Another object of this invention is tp provide a step having extraordinary strength and durability so as to withstand exposure to abusive environmental conditions and severe impacts without being permanently deformed or damaged.

Another object of this invention is to provide a step which, while fulfilling the above objects, is simple in construction and design and inexpensive to manufacture.

These and other objects of the present invention will become more readily apparent upon reference to the following specification and drawings.

BRIEF DESCRIPTION OF THE DRAWINGS

FIG. 1 is a fragmentary side elevational view of the rear end portion of an earthmoving scraper vehicle having mounted thereto a yieldable step embodying the principles of the present invention.

FIG. 2 is an enlarged sectional view of the step taken along the line II—II of FIG. 1.

FIG. 3 is an enlarged fragmentary side elevational view similar to FIG. 1, but showing a modification of the present step.

DETAILED DESCRIPTION

Referring more particularly to the drawings, a yieldable vehicle step embodying the principles of the present invention is generally indicated at 10 in FIG. 1 for mounting to a side supporting surface 12 of a vehicle frame, such as a rear push frame 14 of a tractor-scraper vehicle, not shown.

In addition to the side surface 12, the frame includes a bottom surface 15 which will be understood is disposed a substantial distance from the ground upon which the vehicle travels to provide sufficient operating clearance therewith. An indented step or cutout 16 is preferably provided integrally in the side surface 12 of the frame in spaced elevational relation above and to one side of the step 10 to provide a second foothold for assisting a workman or operator in mounting the vehicle, as will hereinafter be more fully described.

In general, the step 10 is generally U-shaped including a horizontal base or rigid foot supporting portion 20 and a pair of deflectable leg portions 21 and 22 for pendantly supporting the foot supporting portion from the side surface 12. Each leg is constructed from a length of steel chain 24 and an outer deformable stiffener member of resilient material, such as a hose 25, closely circumposed about the chain. The chain 24 provides a high degree of tensile strength while freely permitting the step to be deflected upwards or in any direction laterally, such as when struck by an obstacle while the vehicle is moving so as to make the step almost indestructable. The hose 25 circumposed about the chain adds sufficient lateral rigidity so as to limit or prevent undue swinging movement of the step when the step is supporting the weight of a man, such as the operator, as he uses the step to dismount or mount the vehicle. However, the elastic deformability provided by the hose still allows the step to deflect when struck by the obstacle mentioned above and is effective in returning the step to its original or proper position after such occurrence.

In particular, the rigid foot supporting portion 20 is preferably constructed from an elongated, rectangularly shaped steel plate having apertures 28 adjacent its opposite ends. An eye-shaped connector 29 connected to the bottom link of the chain 24 has a shank portion 31 disposed through the apertures 28 of the foot supporting portion and secured therein in any suitable manner, such as by welding. It will be understood that a nut, not shown, could just as well be used. Each chain is preferably constructed from standard size links of from approximately 3/16 to ⅜ inches in cross sectional diameter, 1 to 2 inches in overall length and ¾ to 1½ inches in overall width. Each hose preferably has an inside diameter substantially equal to the width of the chain links being used and may be constructed with a braided steel reinforcing layer, such as commonly found in standard hydraulic hose.

Each leg portion is preferably connected to a side supporting surface 12 of the frame 14 by a bolt 34. The bolt is shown being disposed through the upper end of the hose and the upper link of the chain 24, through a suitable aperture 35 through the side surface 12 and in screw threaded engagement with a weld nut 36 affixed to the inside of such surface. An annular spacer 38 is preferably provided between the hose and the side surface to insure that the chain hangs properly.

The bolts are also preferably positioned a sufficient distance above the bottom surface 15 of the frame so that the upper portions of the legs 21 and 22 receive support through abutting engagement with the side surface 12, thus reducing any tendency to swing freely.

Alternately, as shown in the modified embodiment of the present invention in FIG. 3, the legs of the step may be secured to the frame by welding the upper links of each chain to a weld block 39, which in turn is welded to the side surface 12. Also as shown in FIG. 3, the foot supporting portion 20 may be constructed from an elongated, cylindrically shaped steel bar which is secured to the leg portions 21 and 22 by welding the bottom links of the chains 25 underneath the opposite ends of such bar.

Thus from the foregoing, it is apparent that the construction of the present yieldable vehicle step 10 fully satisfies the objects of the present invention by providing a step which is deflectable in substantially any direction upon being struck by an obstacle when the vehicle is in motion while retaining sufficient rigidity to lateral deflection to prevent undue swinging movement thereof when being used for mounting or dismounting the vehicle. The chains of the leg portions provide the step with extraordinary tensile strength so as to withstand extreme abuse during the operation of the vehicle without having any detrimental affect to the useful service life of such step. The elastic deformability of the hose surrounding the chain advantageously does not take a permanent set from after being deflected so that the step returns to its original position thereafterwards.

While the invention has been described and shown with particular reference to the preferred embodiments thereof, it will be apparent that variations might be possible that would fall within the scope of the present invention, which is not intended to be limited except as defined in the following claims.

What is claimed is:

1. A yieldable step for a vehicle having a frame portion including a side surface and a lower edge along such side surface, said yieldable step comprising:
    an elongated rigid foot supporting portion;
    a pair of upright leg portions, each leg portion including a length of steel chain and a tubular stiffener member of resilient material provided about said chain and substantially coextensive therealong;
    means for securing one end of each chain to a respective one of the opposite ends of the foot supporting portion; and
    means for attaching the other ends of said chains in spaced apart relation on said side surface of the frame so as to pendantly mount the foot supporting portion in a horizontal position below said frame portion, said means being disposed a sufficient distance above said lower edge of the side surface so that the adjacent ends of the stiffener members are supported by the side surface, said stiffener members providing sufficient lateral rigidity to said leg portions so as to keep the foot supporting portion in its proper position for normal mounting purposes while permitting the leg portions to be deflectable when the step encounters an obstacle during movement of the vehicle.

2. The yieldable step of claim 1 wherein each of said stiffener members is a length of rubber hose.

3. The yieldable step of claim 2 wherein said hoses are reinforced with a layer of braided metal wire embedded therein to make the hoses stiffer so that they give greater lateral support to their respective leg portions.

4. The yieldable step of claim 2 wherein said foot supporting portion is a generally rectangularly shaped metal plate.

5. The yieldable step of claim 1 wherein said chains are constructed from a plurality of links having a cross sectional diameter of approximately from 3/16 to ⅜ of an inch and an overall width of from approximately ¾ to 1½ inches.

6. The yieldable step of claim 5 wherein said attaching means includes a pair of bolts disposed through a respective one of the upper links of said chains and detachably screw threadably mounted into said side surface of said frame portion.

7. The yieldable step of claim 6 wherein said hose has an inside diameter substantially equal to the overall width of said links of the chain.

8. The yieldable step of claim 2 wherein said foot supporting portion is an elongated round metal bar.

9. The yieldable step of claim 8 wherein said chain is secured to said bar by having its last links thereof welded underneath the respective ends of said bar.

10. The yieldable step of claim 5 wherein said attaching means includes a pair of weld blocks mounted to said side surface of said frame portion, with the upper links of said chains being welded to a respective one of said weld blocks.

* * * * *